No. 830,693. PATENTED SEPT. 11, 1906.
L. WESTGAARD.
ANIMAL TRAP.
APPLICATION FILED MAR. 8, 1906.

WITNESSES:
D. E. Carlsen
L. C. Carlsen

INVENTOR:
Levi Westgaard
BY his ATTORNEY:
A. M. Carlsen.

UNITED STATES PATENT OFFICE.

LEVI WESTGAARD, OF VELVA, NORTH DAKOTA.

ANIMAL-TRAP.

No. 830,693.　　　　Specification of Letters Patent.　　　　Patented Sept. 11, 1906.

Application filed March 8, 1906. Serial No. 304,832.

*To all whom it may concern:*

Be it known that I, LEVI WESTGAARD, a citizen of the United States, residing at Velva, in the county of McHenry and State of North Dakota, have invented certain new and useful Improvements in Animal-Traps; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in animal-traps; and the main object is to provide a cheap, novel, and efficient trap, especially for mice, rats, and other rodents. This and other objects I attain by the construction and arrangement of parts illustrated in the accompanying drawings, in which—

Figure 1:
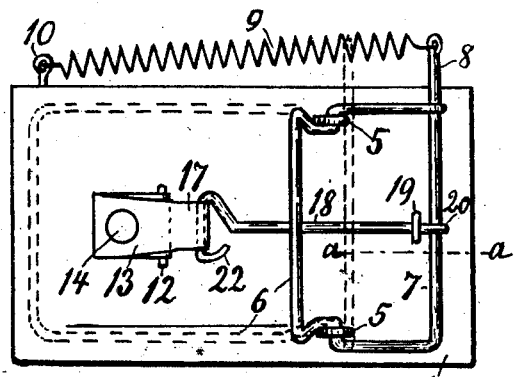
Figure 2:
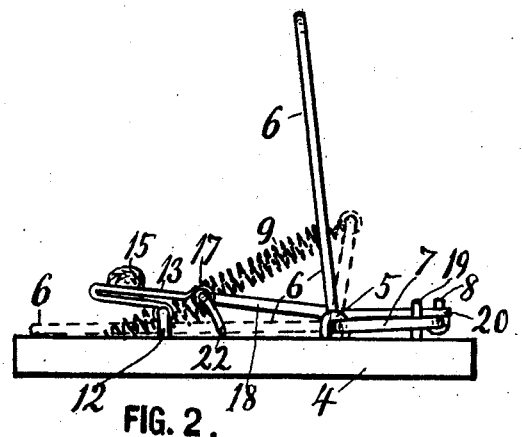
Figure 3:
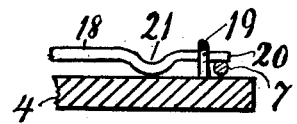

Figure 1 is a top or plan view of my improved trap. Fig. 2 is a side elevation of Fig. 1. Fig. 3 is a sectional side view on the line *a a* in Fig. 1. Both in Fig. 1 and Fig. 2 the trap is shown in the set position in solid lines and in sprung position in dotted lines.

Referring to the drawings by reference-numerals, 4 designates a base or main frame, which may preferably be made of wood. Upon the base is pivotally secured by staples 5 a bail-shaped striker 6, which at the rear side of its legs is provided with a secondary bail 7, substantially at right angle with the main bail 6 and being much shorter than the latter. From the small bail extends a lateral arm 8, from which extends a coil-spring 9, having its other end fastened at 10 near the front corner of the base. Upon the base is further mounted on a broad staple 12 the trigger 13, having a cavity 14 for holding a bait, as indicated at 15 in Fig. 2.

To the upwardly-bent rear arm 17 of the trigger is pivotally secured a rod 18, sliding in a staple 19 and having its end 20 held high enough by the downward bend 21 (see Fig. 3) to be readily pushed upon the small bail 7, and thus to hold the trap in set position until the rod 20 is pulled forward by a downward motion of the front part of the trigger, which motion may be caused by the animal's trying to eat the bait or stepping on the trigger to reach the bait, or by walking upon the trigger when the trap is placed in the pathway of the animal.

The front end of the trip-rod 18 is beyond its pivoting-point formed into a supporting-leg 22, which touches the platform and holds in correctly-set position the trigger, which would otherwise be tilted too far down with its rear end by the downward action of the staple 19 when the bail 7 presses upward under the end 20 of the rod.

From the above description it will be seen that, while in all ordinary traps having a striker the spring has almost spent its force when the striker reaches the animal and when it is farthest from the animal and idle the spring force is so great that one or more levers must be used to reduce the pressure before a trigger can be applied, in the present trap the raising upward of the bail 7 when the trap is sprung gives the spring the greatest leverage to hold the striker down with force upon the animal, and when the striker is set up the yoke 7 falls almost in line with the pull of the spring, so that the latter has so little force on the striker that the latter is held up without lever mechanism, the striker being easily held by the sliding rod 18 engaging the small bail. Not only the cost of making a lever mechanism is saved, but the objection that such mechanism scares the animals is also obviated.

Having thus described my invention, what I claim, and desire to secure by Letters Patent, is—

1. An animal-trap comprising a flat base, a striker pivotally mounted thereon to strike upon the base, said striker having near the base a rearward angular extension with a lateral arm, a pulling coil-spring extended from said arm to the front corner of the base, a trigger pivotally mounted upon the base, a horizontal guided trip-rod operated by the trigger and slidingly entering upon the rearward extension of the striker to hold it set, substantially as set forth.

2. An animal-trap comprising a flat base, a striker pivotally mounted thereon to strike upon the base, said striker having near the base a rearward angular extension with a lateral arm, a pulling coil-spring extended from said arm to the front corner of the base, a trigger pivotally mounted upon the base, a horizontal guided trip-rod operated by the trigger and slidingly entering upon the rearward extension of the striker to hold it set, substantially as set forth; said sliding trip-rod being supported at its front end at an elevation holding the trigger in a properly-set position.

3. An animal-trap comprising a flat base, a striker pivotally mounted thereon to strike upon the base, said striker having near the base a rearward angular extension with a lateral arm, a pulling coil-spring extended from said arm to the front corner of the base, a trigger pivotally mounted upon the base, a horizontal guided trip-rod operated by the trigger and slidingly entering upon the rearward extension of the striker to hold it set, substantially as set forth; said sliding rod having its rear end guided at proper elevation to slidingly engage the extension of the striker when the latter is raised.

In testimony whereof I affix my signature in presence of two witnesses.

LEVI WESTGAARD.

Witnesses:
 NELS WESTGAARD,
 G. N. LIVDAHL